United States Patent Office 2,835,711
Patented May 20, 1958

2,835,711

PREPARATION OF FLUOROCARBONS AND CHLOROFLUOROCARBONS

John K. Wolfe, Burnt Hills, and Newell C. Cook, Schenectady, N. Y., assignors to General Electric Company, a corporation of New York No Drawing. Application July 18, 1955
Serial No. 522,878

8 Claims. (Cl. 260—653)

This invention relates to methods of preparing fluorocarbons and chlorofluorocarbons. The term "fluorocarbons" defines hydrocarbons wherein some or all of the hydrogens have been replaced by fluorine; the term "chlorofluorocarbons" defines hydrocarbons wherein some or all of the hydrogens have been replaced by both chlorine and fluorine. More particularly, this invention relates to a method of preparing fluorocarbons which comprises reacting a fluoride of a group IIA element of the periodic table and carbon at high temperatures. This invention also relates to a method of preparing chlorofluorocarbons which comprises reacting a fluoride of a group IIA element of the periodic table and carbon at high temperatures. This invention also relates to a method of preparing chlorofluorocarbons which comprises reacting a fluoride of group IIA element of the periodic table, a metal chloride and carbon at high temperature. The meaning of a group IIA element is herein described and can also be found in the Periodic Chart of Elements on pages 56–57 of Lange's Handbook of Chemistry (8th edition), 1952.

Phosphates which are very valuable as source materials for fertilizers, phosphoric acid and products thereof are usually obtained from crude tricalcium phosphate. Crude tricalcium phosphate as mined is generally combined with other compounds in the form of a very complex mineral known as fluoro apatite, $$3Ca_3(PO_4) \cdot CaF_2 \cdot CaCO_3$$

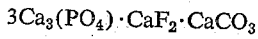

Industrially, crude fluoro apatite is treated with sulfuric acid to form calcium superphosphate $$[(CaH(PO_4)_2 + CaSO_4)]$$

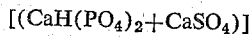

a product in great demand as fertilizer. During the calcium superphosphate reaction calcium fluoride present in the crude rock reacts with the added sulfuric acid to form hydrogen fluoride according to the following reaction $$CaF_2 + H_2SO_4 \rightarrow CaSO_4 + 2HF$$

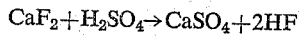

Hydrogen fluoride produced in this process can, of course, be converted to such non-volatile materials as the fluorides of the elements of group IIA. Since the preparation of calcium superphosphate is a large scale operation whereby large amounts of fluorides are simultaneously produced, a process of converting these fluoride by-products to commercially valuable compounds would be of great economic importance.

Inasmuch as fluorocarbons are more stable thermodynamically and more resistant to chemical attack than most analogous organic compounds, they have been put to a large variety of industrial uses. The lower fluorocarbons and halofluorocarbons are particularly useful as refrigerants, as gaseous insulation in electrical equipment, as propellants in aerosols, etc., since as a class these compounds are chemically and electrically stable, are non-inflammable, and have other desirable properties, such as being comparatively non-corrosive with respect to metals. For example, the use of fluorocarbons and chlorofluorocarbons as gaseous electrical insulators is disclosed in Patent 2,221,670—Cooper, which is assigned to the same assignee as the present invention. Thus a process capable of converting the fluorine containing by-products of the superphosphate process into these useful compounds would be of great economic importance.

Unexpectedly, we have now discovered a method of preparing fluorocarbons which comprises reacting a fluoride of a group IIA element of the periodic table and carbon at high temperatures. If mixed chlorofluorocarbons are desired from the process, a metal chloride can be added to the fluoridecarbon reaction mixture and heated. Although the reaction can be carried out in the presence of small amounts of water, the reactants preferably should be substantially anhydrous. The fluorocarbon and chlorofluorocarbon gases emitted from the reaction are then collected and separated, if desired.

When the fluoride or fluoride-chloride containing composition is high melting, the reaction is advantageously carried out at a temperature at which the mixture is molten. For example, with calcium fluoride the reaction should preferably be carried out above 1330° C., the melting point of the calcium fluoride. If desired, high melting halides can be fused and the solidified fused product subjected to heat of a carbon arc. A suitable apparatus capable of collecting the evolved gases should be used so that the gases emitted by the reaction are easily collected. When the fluorides and chlorides comprise a high melting mixture, the reaction may be carried out in the same manner as with the fluorides except that the products comprise chlorofluorocarbons. For example, admixed calcium fluoride and calcium chloride can be heated at high temperatures in the presence of carbon to produce chlorofluorocarbons. The relative ratio of the reactants is not critical, although carbon is generally used in excess, particularly when a carbon arc is employed.

Since high temperatures are required for the reaction, any means of producing high temperatures may be used. Whereas electric furnaces are the most convenient and commercially available means of producing extremely high temperatures, they are preferred. The three main types of electric furnaces are the arc furnace, the resistant furnace, and the induction furnace. In the arc furnace, the heat of the arc is utilized. In the resistance furnace, no arc is formed, but the electrical energy is entirely transformed into heat. If the material furnishing the resistance is the charge itself, the resistance furnace is said to have direct heating. If a material is added purposely for the sake of its resistance it furnishes without being part of the reacting charge, the furnace is said to have an indirect heating. The induction furnace is applied only to conducting substances (carbon is conducting); it is based upon the fact that if an alternating current of high frequency is passed through a coil of many turns, a conducting material placed in the center of the coil will become red hot in a short time. In addition to these three types, furnaces involving a combination of these types may be used.

With proper adaptation, such as a means for collecting the emitted gases, etc., many of the currently used electric furnaces may be employed in the process. Among the types of arc furnaces that can be employed are: the Direct Arc Furnace type wherein the arcs are in series so that the current passes from one electrode to a bath comprising the reaction mixture and out the other electrodes, examples of which are the Heroult Three Phase, the 'Lectromelt Three Phase, Swindell Three Phase, Fiat Three Phase, Stobie Two Phase, Vom Baur Two Phase, etc.; the Direct Arc Free Hearth Electrode Furnace type where the bottom of the furnace functions as an electrode such as the Girod Single Phase, Keller Three Phase, Snyder's Single Phase, etc.; the Direct Arc Buried Hearth Electrode Furnace type where the voltage on the bottom electrode is of a lower order so as to balance the current between the bottom and the two top electrodes such as the Greaves-Etchell Three Phase and Electrometals Two Phase, etc.; the Indirect Arc Furnace type where the arcs are between electrodes and not between electrodes and slug, or electrode and charge, or electrodes and hearth through the charge such as the Stassana Single Phase, the Bassanese Single Phase, Rennerfelt Two Phase, etc.; and the Mixed Type of furnace which combine the indirect and the direct arc for two or more phase currents, the buried hearth, etc. such as the Tagliaferri Three Phase, the Booth Two Phase, the Nathusius Three Phase, etc. These arc furnaces as well as the resistance and induction furnaces are discussed at greater length in Mantell "Industrial Electro-Chemistry," chapter 21, pages 565–597, McGraw-Hill Book Co., Inc., 3rd edition (1950).

These furnaces are capable of producing the high temperatures required for the reaction which are 1000–7000° C. or higher but preferably above 2000° C. Because such high temperatures are employed, it is preferable to carry out the reaction in an inert atmosphere so that the amount of by-products, such as the oxides of carbon, etc., are reduced. The preferred embodiment comprises the use of a carbon arc, the temperature of which is estimated to be from about 2000° C. to 5000° C. The upper temperature limit is not critical although the products preferably should be removed from the heated zone as soon as they are formed.

Carbon used in the reaction can be added as such or may be part of the container or arcing mechanism. Although the use of any specific carbon is not critical, pure carbon is preferred since fewer by-products are thus formed during the process. The impurities present in carbon may be removed by treating the carbonaceous material at high temperatures and/or reduced pressure prior to reaction. Various kinds of carbon may be used, such as vegetable and animal blacks, thermal black, channel black, furnace black, lamp black, oil black, coke, graphite or any other suitable source of carbon. An excellent description of various kinds of graphite and other carbonaceous materials useful as reactants, electrodes or as part of the reaction container is found in Riegel "Industrial Chemistry," 5th edition, pages 329–334, published by Rinehold Publishing Corp. (1949) and in Faith et al., "Industrial Chemicals," pages 174–182, published by John Wiley & Sons, New York (1950).

In order that those skilled in the art may better understand how the present invention may be practiced, the following examples are given by way of illustration and not by way of limitation.

Example 1

Calcium fluoride was intimately mixed with coconut charcoal in a graphite crucible, which crucible was completely enclosed except for an outlet leading to a liquid nitrogen-cooled receiver. Graphite electrodes were immersed in the charcoal-fluoride mixture and about 40–100 amperes at 15–200 volts D. C. were applied to the system. An arc was formed and the calcium fluoride-carbon mixture was converted to a heterogeneous melt. The gaseous fluorocarbon products produced were collected in the liquid nitrogen-cooled receiver. Both mass spectrometer and infra-red analysis identified carbon tetrafluoride as the main product. The solid product ($CaC_2$) remaining in the reactor was a dark, fused mass having a characteristic carbide order. When this residue was reacted with water, acetylene was formed.

Instead of using calcium fluoride, the other fluorides of group IIA elements can be used which are the fluorides of beryllium, magnesium, calcium, strontium, barium and radium. Mixtures of fluorides of elements of group IIA can also be used in the process.

Example 2

An equimolar mixture of anhydrous calcium chloride and anhydrous calcium fluoride was melted to a homogeneous liquid melt in a carbon crucible at about 1080° C. in an inert (argon) atmosphere. The salt melt was allowed to solidify and a hole was drilled through the center. The crucible containing the calcium chloride-calcium fluoride salt melt was enclosed within a system having an outlet which was connected to a liquid nitrogen-cooled receiver. A carbon electrode was lowered into the hole in the melt and an arc was made between this electrode and the carbon crucible when an electrical current (40–70 amperes at 15–200 volts D. C.) was applied thereto. The emitted gases which were collected in the receiver comprised $CF_3Cl$, $CF_2Cl_2$, $C_2F_5Cl$ and traces of higher fluorochloro compounds as determined by a mass spectrometer. Carbon dioxide, nitrogen and acetylene were also found in the product.

In addition to the specific fluorides and chlorides above disclosed, other mixtures can be used, for example, the mixture of the fluorides and chlorides of elements of group IIA of the periodic table.

Besides being useful as gaseous insulation (dielectric material) and refrigerants, and propellants for aerosols, etc., the products of this invention can be converted to tetrafluoroethylene, the starting material for perfluoroethylene polymers, as described in Schildknecht, "Vinyl and Related Polymers" (Wiley, 1952), pages 483–487.

What we claim as new and desire to secure by Letters Patent of the United States is:

1. A method of preparing a material selected from the class consisting of fluorocarbons and chlorofluorocarbons which comprises reacting carbon at high temperature with a material selected from the class consisting of calcium fluoride and a mixture of calcium fluoride and calcium.

2. The method of claim 1 in which the high temperature is produced by an electric arc.

3. The method of preparing fluorocarbons which comprises reacting carbon at high temperature with calcium fluoride.

4. The method of claim 3 in which the high temperature is produced by an electric arc.

5. The method of preparing chlorofluorocarbons which comprises reacting carbon at high temperature with a mixture of calcium fluoride and calcium chloride.

6. The method of claim 5 in which the high temperature is produced by an electric arc.

7. The method of preparing a material selected from the class consisting of fluorocarbons and chlorofluorocarbons which comprises reacting carbon at high temperature with a member of the class consisting of calcium fluoride and mixtures of calcium fluoride with a chloride of a metal of Group IIA of the Periodic Table wherein the chlorine atoms of the product chlorofluorocarbons are derived solely from the said chloride of a metal of Group IIA of the Periodic Table.

8. The method of claim 7 in which a high temperature is produced by an electric arc.

References Cited in the file of this patent

UNITED STATES PATENTS

| | | |
|---|---|---|
| 2,709,185 | Muetterties | May 24, 1955 |
| 2,709,187 | Farlow et al. | May 24, 1955 |
| 2,709,188 | Farlow et al. | May 24, 1955 |
| 2,709,190 | Farlow et al. | May 24, 1955 |
| 2,739,989 | Barringer et al. | Mar. 27, 1956 |